July 16, 1946.   J. MAGDUS   2,404,308
VEHICLE WHEEL
Filed Jan. 15, 1945
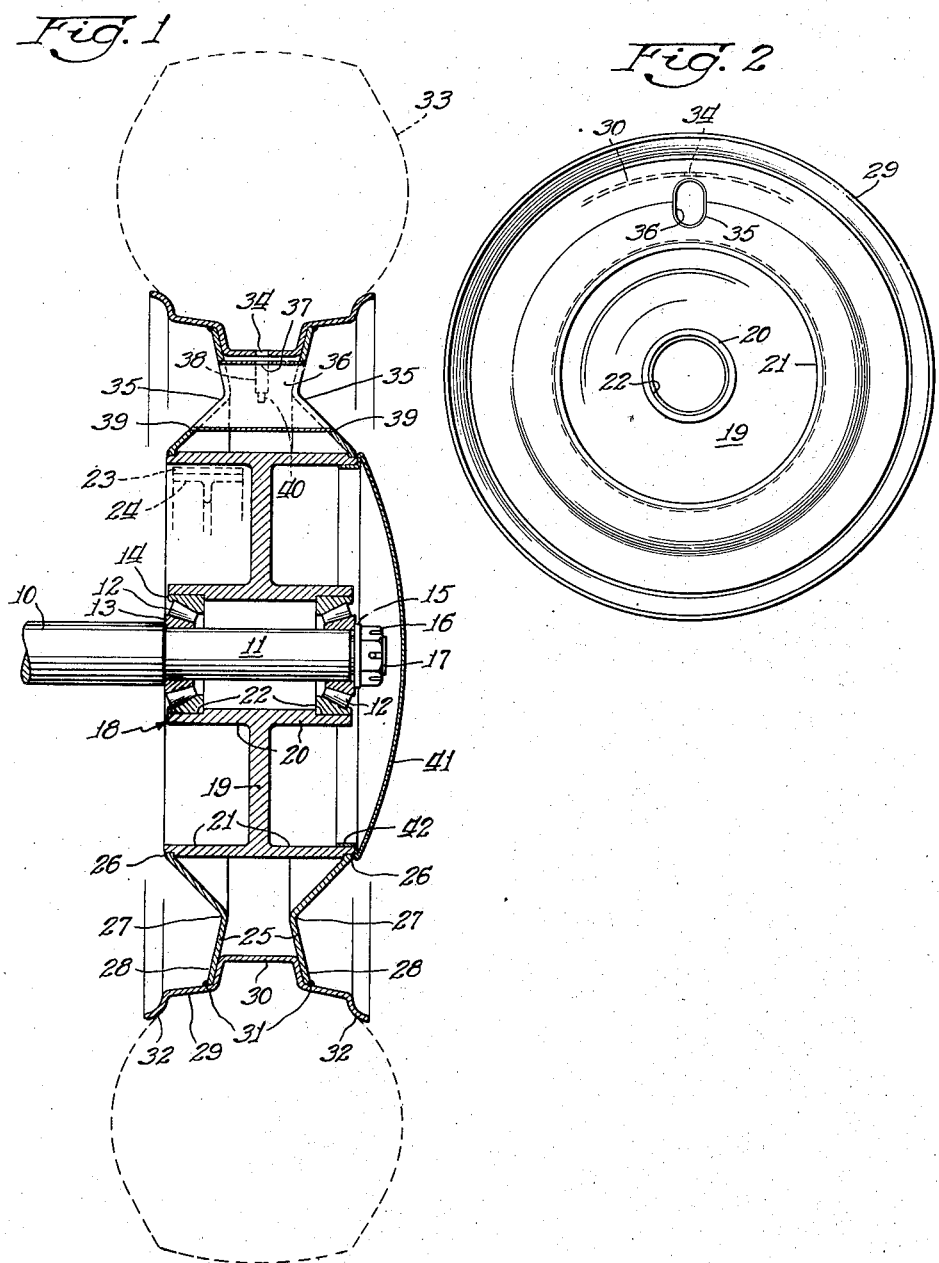
Inventor:
Joseph Magdus
By A. Trevor Jones
Atty.

Patented July 16, 1946

2,404,308

UNITED STATES PATENT OFFICE 2,404,308

VEHICLE WHEEL

Joseph Magdus, Chicago, Ill.

Application January 15, 1945, Serial No. 572,826

6 Claims. (Cl. 301—6)

This invention relates to a reversible vehicle wheel or the like.

Among other objects, the invention aims to provide a strong, durable wheel which may be made in part of sheet metal stampings for lightness of weight and rigidity, while at the same time effecting enhanced economy of manufacture.

In one aspect, the invention discloses such a wheel in which a brake drum member is provided integrally with the wheel itself.

In an important aspect, also, the wheel is made so as to be of duplex character or reversible, so that either face of the wheel may be placed outwardly of the vehicle without reversing the tire, the tire valve being nevertheless accessible at the outer face of the wheel in either position.

Another object is to provide such a wheel which is simple and may be readily adapted for interchangeability in varied uses and styles of vehicles, while retaining important advantages herein more particularly pointed out.

These and other objects will be apparent from the following description, taken together with the accompanying drawing, of an illustrative embodiment of the invention, and in which drawing—

Figure 1 is a vertical sectional view of a wheel following the present invention, one form of attachment to an axle being exemplified, and the tire being indicated in dotted lines; and Figure 2 is a somewhat reduced face view of the wheel of Figure 1 removed from the axle and the tire being omitted.

Referring in detail to the illustrative construction shown in the drawing, the numeral 10 indicates an axle illustrative of such a vehicle part upon which the wheel of the present invention may be mounted, the axle having a bearing portion 11 and anti-friction bearing devices, each comprising the usual annular series of cone bearings 12 and concentric races 13 and 14 interposed between the axle bearing portion and the wheel hub, a washer 15 and securing nut 16 being thereafter engaged with the outer threaded end 17 of the axle.

In accordance with the present invention, the hub member of my improved wheel is of one piece and preferably formed as here shown in the drawing and indicated by the numeral 18. This hub member, in this instance, as shown, being of double H formation in diametrical cross-section, as seen from Figure 1 and comprising an annular disc-like portion 19 which has a single web lying in a plane medial of the wheel and perpendicular to its axis, an H formation being formed on each side of the axis by the double U formation extending from the disc portion 19 outwardly toward each face of the wheel, and each such U formation being formed by the inner flange 20 and outer flange 21. Thus, the hub member is not only of double H formation, but is also of a plurality of double U formations both on each side of the disc portion of the wheel and also on each side of the axis of the wheel.

In other words, in any cross-section of the wheel by a plane intersecting the axis and extending in the direction of the axis as shown in Figure 1, there are one such H formations appearing on each side of the axis and two such U formations on each side of the axis, making two H formations in all and four U formations.

The inner flanges 20 of the wheel disc 19 constitute a cylindrical hub proper for the wheel, the outer ends of which may each be similarly counterbored as at 22 to receive the anti-friction devices each of which is represented by the numerals 12—13—14. Since the hub may be identical on both faces of the wheel and desirably is as shown the wheel is thus reversible, as will later be more particularly pointed out, and may be placed on the axle 10 in either direction.

The flanges 21 of the disc 19 of the wheel have a two-fold function also. Each annular face represented by the inner faces of the annular flanges 21 on each side of the central disc portion 19 provides mounting means in the nature of a brake drum for a brake band generally indicated in dotted lines by the numeral 23 for the usual cooperation with a brake shoe similarly indicated as by the numeral 24, the details of which brake mechanism are conventional and need not be here further described, it being the purpose of the present disclosure however to provide a wheel which is thus capable itself of serving as the mounting for the brake mechanism and for providing a double mounting in the sense that each face of the wheel provides such a brake drum mounting whereby the wheel is reversible as here contemplated.

The wheel as here shown also includes a plate member and in the embodiment here illustrated a pair of plate members 25 each of which is also annular with their inner edges secured, as for example by welding as at 26, to the outer edges of the outer flanges 21 of the wheel disc portion 19. Intermedially, the plate members 25 are advantageously annularly frusto-conical or troughed as at 27, for enhanced strength and are flared apart at their outer edges as at 28.

Finally, the wheel includes a rim member indicated by the numeral 29. This rim member is of the drop center type and has a central bead or rib 30 which is annular and is annularly received between the flared edges 28 of the plate members 25, and may be serviceably welded thereto as at 31. From this inner annular bead 30 the rim member extends outwardly toward each face of the wheel and terminates at these faces respectively in a felly 32, which is in accordance with the usual construction of wheels in this particular.

The usual pneumatic tire may now be mounted on the rim 29 of the wheel and I provide means whereby the valve stem of the tire may be rendered accessible from either face of the wheel so that the wheel may be reversed while carrying with it the conventional tire here indicated in dotted lines by the numeral 33 and without anything being done, other than this, to render the tire valve accessible from either face of the wheel. To this end, and as here shown, I provide a tire valve opening 34 in the center of the rib portion 30 of the wheel rim and communicating with plate openings. I have arranged a pair of openings 35 in each of the plate members 25. To seal these openings 35 against entry of dirt or the like to the hollow interior space between the plate members 25, I may provide a tube 36 which is received in the opening 35 and has inwardly and oppositely directed V-shaped ends conforming to the trough-like contour 27 of the plates. The closure 36 has a perforation therein as at 37 registering with the perforation 34 to admit the valve stem here indicated in dotted lines by the numeral 38. The closure 36 may be welded to the plate members as at 39 annularly about the opening 35.

It will be understood that the closure 36 is open at both ends conforming to the openings 35 so that the fingers of one's hand may be passed through either of these openings to reach the valve stem cap 40 for the purpose of unscrewing or replacing this cap and for the purpose of passing to the valve stem the service end of an air hose (not shown) for replenishing the air supply of the tire in the usual way, the openings 35 being large enough for this purpose.

Still carrying out the reversible character of the wheel, the usual hub cap 41 is adapted for use with my improved wheel and the wheel is so arranged that the hub cap may be placed over whichever face of the wheel happens to be outward at any particular time. As representative of this adaptability and for illustrative purposes, I here show the hub cap 41 as having an inner annular flange 42 which may be pressed by a snug friction fit into the inner annular face of the outer hub flange 21, thus covering and protecting the axle nut 16 and the anti-friction bearing at the outer end of the axle.

It is to be understood that the invention is not intended to be limited to details of construction here shown for purposes of exemplification of the present invention, and such changes may be made as fall within the scope of the following claims without departing therefrom.

The invention having been described, what is here claimed is:

1. In a reversible vehicle wheel, the combination with a rim member therefor, of a plate member secured to said rim, and a one-piece hub member of double H formation in diametrical cross-section secured centrally of said plate member, said hub member integrally comprising a brake drum and providing a pair of brake drum members at each face of the wheel.

2. The structure of claim 1 wherein the hub member is of double H formation in cross-section whereby the wheel is reversible and wherein a hub cap member is provided engageable with said brake drum at either face of the wheel.

3. In a reversible vehicle wheel or the like, the combination of a one-piece hub part having an axle receiving portion, a single web disc portion and a pair of brake drum forming portions integrally provided by said one-piece hub part, said brake drum portions extending outwardly of said disc portion on each side thereof and facing respectively in opposite directions on opposite sides of the wheel, a pair of plate parts annularly encircling and secured to the said brake drum forming portions, tire valve openings in said plate parts registering on opposite sides of the wheel, and a rim part carried by the plate parts, said plate parts being secured to said rim part, and said rim part having a tire valve opening communicating with said openings in the plate parts.

4. The structure of claim 3 wherein a tube-like closure open at each end is received in said openings in the plate parts to seal the space between the plate parts from access and wherein said closure has an opening communicating with the opening in the rim part.

5. In a reversible vehicle wheel or the like, the combination of a one-piece hub part having an axle receiving portion, a central disc portion and a pair of brake drum forming portions integrally provided by said one-piece hub part, said brake drum portions extending outwardly of said disc portion on each side thereof and facing respectively in opposite directions on opposite sides of the wheel, a pair of plate parts annularly encircling and secured to the said brake drum forming portions, and a wheel rim part carried by the plate parts, said plate parts being secured to said rim part.

6. In a vehicle wheel or the like, the combination of a one-piece hub part having an axle receiving portion, a radially extending disc portion and an annular flanged brake drum portion, said flanged portion extending axially on each side of said disc portion, a plate part annularly encircling and secured to the said flanged portion, and a wheel rim part encircling and secured to the plate part.

JOSEPH MAGDUS.